United States Patent
Slezak et al.

(10) Patent No.: US 9,288,065 B2
(45) Date of Patent: Mar. 15, 2016

(54) TECHNIQUES FOR PROTECTING DIGITAL MULTIMEDIA INTERFACES

(75) Inventors: Yaron Slezak, Raanana (IL); Genady Veytsman, Netanya (IL); Evgeny Rogachov, Hod-Hasharon (IL); Gilad Kirshenboim, Petach Tikva (IL)

(73) Assignee: CADENCE DESIGN SYSTEMS INC., San Jose, CA (US)

( * ) Notice: Subject to any disclaimer, the term of this patent is extended or adjusted under 35 U.S.C. 154(b) by 864 days.

(21) Appl. No.: 13/355,687

(22) Filed: Jan. 23, 2012

(65) Prior Publication Data

US 2013/0187483 A1 Jul. 25, 2013

(51) Int. Cl.
*H04L 12/00* (2006.01)
*H04N 21/4363* (2011.01)
*G09G 5/00* (2006.01)

(52) U.S. Cl.
CPC ............ *H04L 12/00* (2013.01); *G09G 5/006* (2013.01); *H04N 21/43635* (2013.01); *G09G 2330/025* (2013.01); *G09G 2330/04* (2013.01); *G09G 2370/12* (2013.01); *Y10T 307/826* (2015.04)

(58) Field of Classification Search
None
See application file for complete search history.

(56) References Cited

U.S. PATENT DOCUMENTS

| | | | | |
|---|---|---|---|---|
| 6,028,944 A * | 2/2000 | Markow et al. | ............... | 381/120 |
| 7,397,283 B2 * | 7/2008 | Chiu et al. | ............... | 326/83 |
| 7,864,607 B2 * | 1/2011 | Patel et al. | ............... | 365/204 |
| 8,384,445 B2 * | 2/2013 | Wu | ............... | 327/108 |
| 8,589,998 B2 * | 11/2013 | Wu et al. | ............... | 725/127 |
| 8,896,159 B2 * | 11/2014 | Yeh | ............... | 307/112 |
| 2010/0169517 A1 * | 7/2010 | Singh | ............... | 710/36 |
| 2011/0283129 A1 * | 11/2011 | Guillerm | ............... | 713/324 |
| 2012/0229076 A1 * | 9/2012 | Zhu et al. | ............... | 320/107 |

FOREIGN PATENT DOCUMENTS

JP 2011164943 A * 8/2011

* cited by examiner

*Primary Examiner* — Rexford Barnie
*Assistant Examiner* — David Shiao
(74) *Attorney, Agent, or Firm* — Pearl Cohen Zedek Latzer Baratz LLP

(57) ABSTRACT

A sink circuit for protecting connectivity of a digital multimedia interface, the sink circuit is connected in a sink multimedia device. The sink circuit comprises a sink port configured to provide a connection to a source multimedia device; a termination coupled to the sink port; and a protection component coupled in series between the termination and a power source of the sink multimedia device, the protection component blocks any direct current path through the sink port when the sink multimedia device is off and the power source of the source multimedia device is on.

10 Claims, 6 Drawing Sheets

TECHNIQUES FOR PROTECTING DIGITAL MULTIMEDIA INTERFACES

TECHNICAL FIELD

This invention generally relates to electronic display device connectivity, and more particularly to protecting interfaces providing such connectivity from high direct currents.

BACKGROUND OF THE INVENTION

The high-definition multimedia interface (HDMI™) is a licensable compact audio/video connector interface for transmitting uncompressed digital streams. The HDMI connects digital audio/video (or multimedia) sources (e.g., a set-top box, a DVD player, a personal computer, a video game console, etc.) to a compatible digital audio device and/or video monitor such as a digital television. In contrast to consumer analog standards, the HDMI enforces digital rights management (DRM) on transmitted media.

FIG. 1 shows an exemplary diagram for connecting a multimedia source device 110 to a multimedia sink device 120 through a HDMI link 100. A multimedia source device 110 transmits high speed data using transition minimized differential signaling (TMDS®) characters. The TMDS characters encapsulate video, audio, and auxiliary data and are carried over three TMDS channels 130-1, 130-2, and 130-3. A multimedia sink device 120 receives the TMDS characters and converts them into digital video streams and control codes encoded in the auxiliary data. The control codes include ESS, HSYNC and VSYNC signals. In addition, configuration, system-level control, management, and status information is exchanged between the multimedia source device 110 and the multimedia sink device 120. The system-level control signals include display data channel (DDC) and consumer electronics control (CEO) which are transmitted over channels: SCL 150, SDA 160, and CEO 170.

A clock, typically running at a video pixel rate, is transmitted on a clock channel 140 and is used by the multimedia sink device 120 as a frequency reference for data recovery on the three TMDS channels 130. The TMDS characters are transferred, over the TMDS channels 130, at a rate synchronized with the video pixel rate transported over the clock channel. A pixel rate determines the number of pixels transmitted per second. The transmission rate of TMDS characters is determined by the HDMI standard, for example, in the HDMI specification version 1.4, the data rate is 250 Mb/Sec up to 3.4 Gb/Sec.

The HDMI cable 100 provides a connectivity means that is DC-coupled, thus a capacitor is not used in order to connect the source and sink circuits. As a result, DC current can flow from a source device 110 to a sink device 120, or vice versa. The DC current is a function of the power voltage of the source 110 and sink 120 devices and any resistance between them. Such DC current may be of tens of milliampere (mA) and thus is in lack of any protection such a current may damage the electric circuits of the source and sink device. For example, high DC current level can melt the metal lines in the electric circuits within the integrated circuit (IC).

The problem of high DC current flows is not prominent in present HDMI connectivity, for example, as defined in the HDMI specification, version 1.4a and earlier versions, for the reason that low data transmission rates of signals over the channels 130 and 140 does not deem any termination at the source device 110. For example, for data rates of up to, but less than, 2.25 Gb/Sec, no termination is required. However, with higher data rates, for example, 2.25 Gb/Sec and higher, a termination is recommended to be placed at each line connected to a source port of each of the TMDS channels 130-1 to 130-3 and clock channel 140, to ensure signal integrity and a proper signal transmission. The termination at the source device 110 may cause a DC current path to a ground of a sink device connected to a respective sink port.

This problem is further illustrated in FIG. 2A, where an electric diagram depicting the connectivity of a source port 211 to a sink port 221 through a DC-coupled HDMI connection 230. The source port 211 and sink port 221 may be a port of any TMDS channel or a clock channel of the HDMI. The source port 211 is connected to an output stage 210 of a source device. The output stage 210 includes a termination 212, e.g., in a form of a 50 Ohm resistor. The output stage 210 also includes a power source $V_{SOURCE}$ 213, and devices 214 and 215 which is a current sink device that sets the total current level allowing the setting of the TMDS swing.

The sink port 221 is connected to an input stage 220 of a sink device and also includes a termination 222, e.g., in a form of a 50 Ohm resistor. The input stage 220 also includes a power source $V_{SINK}$ 223 to power the sink device.

In a normal operation of the circuit illustrated in FIG. 2A, current follows from the $V_{SOURCE}$ 213 through the termination 212 and devices 214 and 215 to the ground. When the sink device is on, DC current flows also from the $V_{SINK}$ 223 through the termination 222 and through devices 214 and 215 to the ground at the output stage 210.

However, as illustrated in FIG. 2B, when the sink device is off and the $V_{SINK}$ 223 is grounded. Current follows from the $V_{SOURCE}$ 213 through the termination 212 and devices 214 and 215 to the ground. In addition, DC current flows from the $V_{SOURCE}$ 213 through the termination 212 to the termination 222 at the input stage 220 to the ground. This DC current may damage the source device 210 and the sink device 220 as their current level might be significantly higher than the current level that those devices can handle. For example, if the $V_{SOURCE}$ 213 is a 3.3V power source, then a level of the DC current flows through the termination 212 and through the termination 222, when the $V_{SINK}$ 223 powered off, is 33 mA. In comparison, when the $V_{SINK}$ 223 is on, the level of the DC current that flows through the termination 212 is 12 mA and the level of the DC current that flows through the termination 222 is 12 mA, for a TMDS swing of 1.2v peak-2-peak differentially. Most integrated circuits require operation power voltage of 3.3V and are not designed to handle DC current levels of 33 mA. To support such DC current levels and higher, an IC (that includes, in part, the input stage 220) should be designed with wide metal lines. However, this is an inefficient solution as it increases the size of the IC, and hence its cost and even its performance.

In another scenario, when the sink device is off and the $V_{SINK}$ 223 is floated, a high DC current flows from the $V_{SOURCE}$ 213 through the termination 212 and devices 214 and 215 to the ground. Such DC current may also damage the source device 210 as its DC current level may be significantly higher than the DC current level that the output stage 210 can handle. For example, if the $V_{SOURCE}$ 213 is a 3.3V power source, then a level of the DC current flows through the termination 212, when the $V_{SINK}$ 223 powered off and floated, is 24 mA. In comparison, when the $V_{SINK}$ 223 is on, the level of the DC current that flows through the termination 212 is 12 mA and through termination 222 is 12 mA, for a TMDS swing of 1.2v peak-2-peak differentially.

It should be noted that DC current that flows through the terminations, e.g., terminations 212 and 222, when the sink device is off, is not a spike but rather a steady signal. For example, a TV set (sink device) may be off while a Set-Top box (source device) connected to the TV through a HDMI cable may be powered on. Thus, high DC current levels can flow to the TV set for hours heating and damaging its circuits.

Thus, it would be advantageous to have a solution for protecting HDMI components from DC currents.

SUMMARY OF THE INVENTION

Certain embodiments herein include a sink circuit for protecting connectivity of a digital multimedia interface, the sink circuit is connected in a sink multimedia device. The sink circuit comprises a sink port configured to provide a connection to a source multimedia device; a termination coupled to the sink port; and a protection component coupled in series between the termination and a power source of the sink multimedia device, the protection component blocks any direct current path through the sink port when the sink multimedia device is off and the power source of the source multimedia device is on.

Certain embodiments herein also include a source circuit for protecting connectivity of a digital multimedia interface, the source circuit is connected in a source multimedia device. The source circuit comprises a source port configured for connection to a sink multimedia device; a termination coupled to the source port; and a protection component coupled to the termination and a power source of the source multimedia device, the protection component blocks any direct current path from a power source of the source multimedia device through the source port and any direct current path from the power source of the source multimedia device to a ground of the source multimedia device, wherein the direct current paths are blocked upon a first indication signal that a power source of the sink multimedia device is off and the power source of the source multimedia device is on.

Certain embodiments herein also include a circuit for protecting connectivity of a digital multimedia interface. The circuit comprises a sink port configured for connection to a source multimedia device; a sink termination coupled to the sink port; and a sink protection component coupled in series between the termination and a power source of the sink multimedia device, the protection component blocks any source direct current path through the sink port when a power source of the sink multimedia device is off and a power source of the source multimedia device is on; a source port configured for connection to the sink multimedia device; at least one current device coupled between the source port and a ground of the source multimedia device; a source termination coupled to the source port; and a source protection component coupled between the source termination and a power source of the source multimedia device, the source protection component blocks any sink direct current path through the source port when the power source of the source multimedia device is off and the power source of the sink multimedia device is on.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

FIG. 2A is a schematic electric diagram illustrating DC current flows when the sink device is powered on.

DETAILED DESCRIPTION OF THE INVENTION

Figure 1:
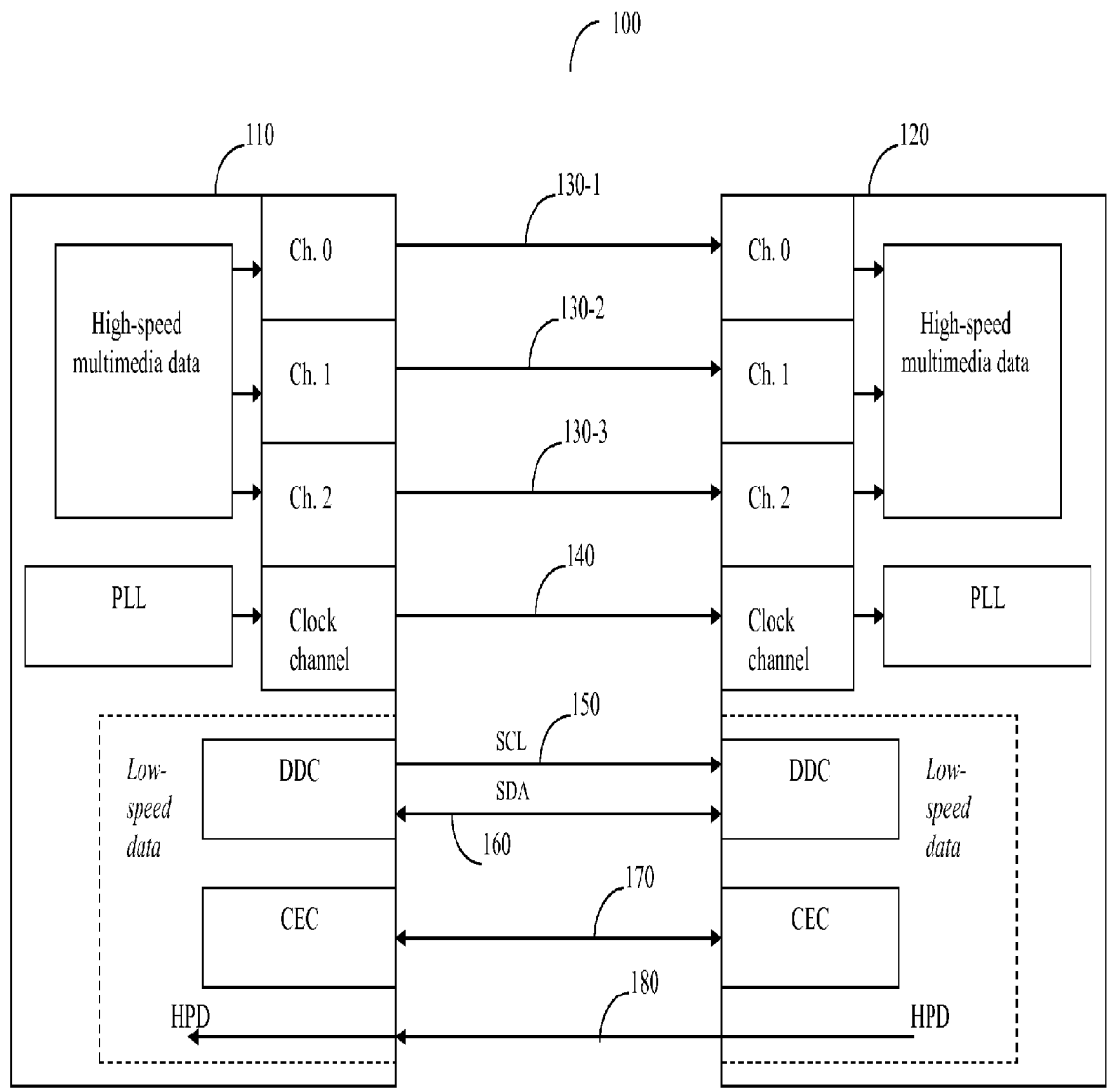
FIG. 1 is a block diagram of an HDMI link.
Figure 2A:
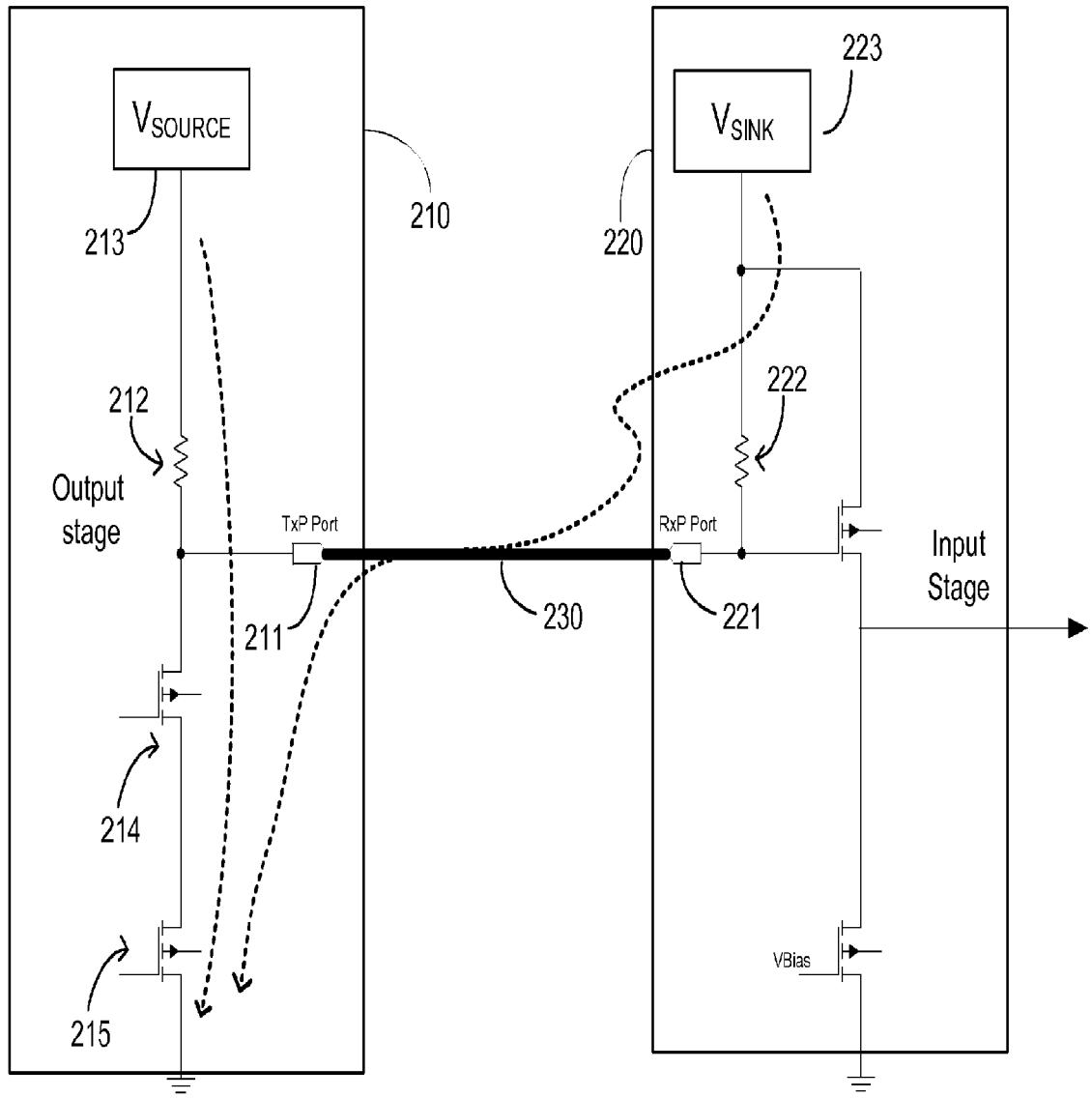
Figure 2B:
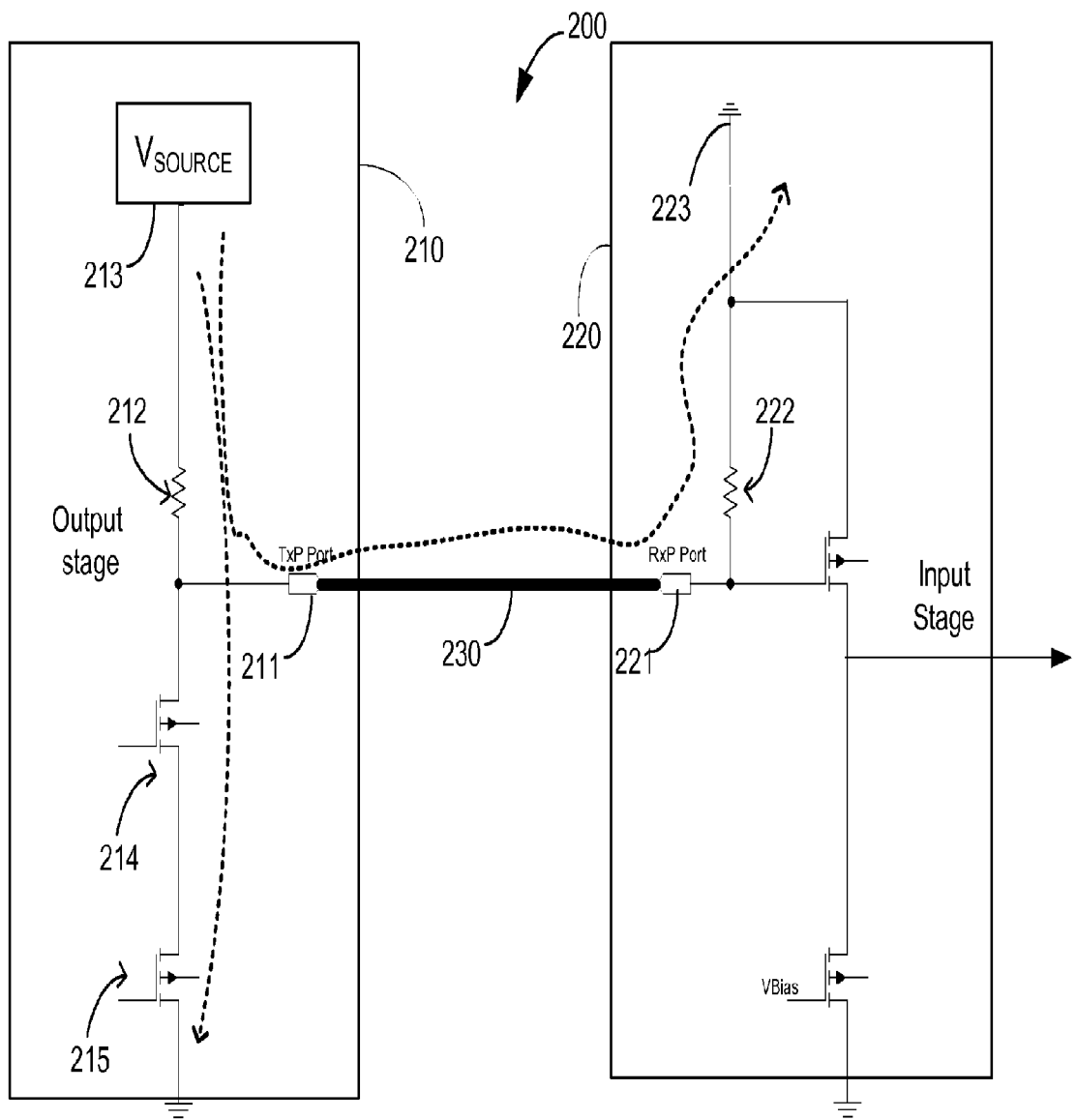
FIG. 2B is a schematic electric diagram illustrating DC current flows when the sink device is powered off.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include techniques for protecting an input stage circuit in a sink device from DC current flows through an HDMI link that can damage the sink device, and for protecting an output stage circuit in a source device from DC current flows through an HDMI link that can damage the source device. Other techniques also include providing a protection mechanism in the source device. The source device may be, for example, a set-top box, a DVD player, a personal computer, a video game console, and so on, and the sink device includes, for example, a digital television. In an embodiment, the source and sink devices are connected using a HDMI cable.

Figure 3:
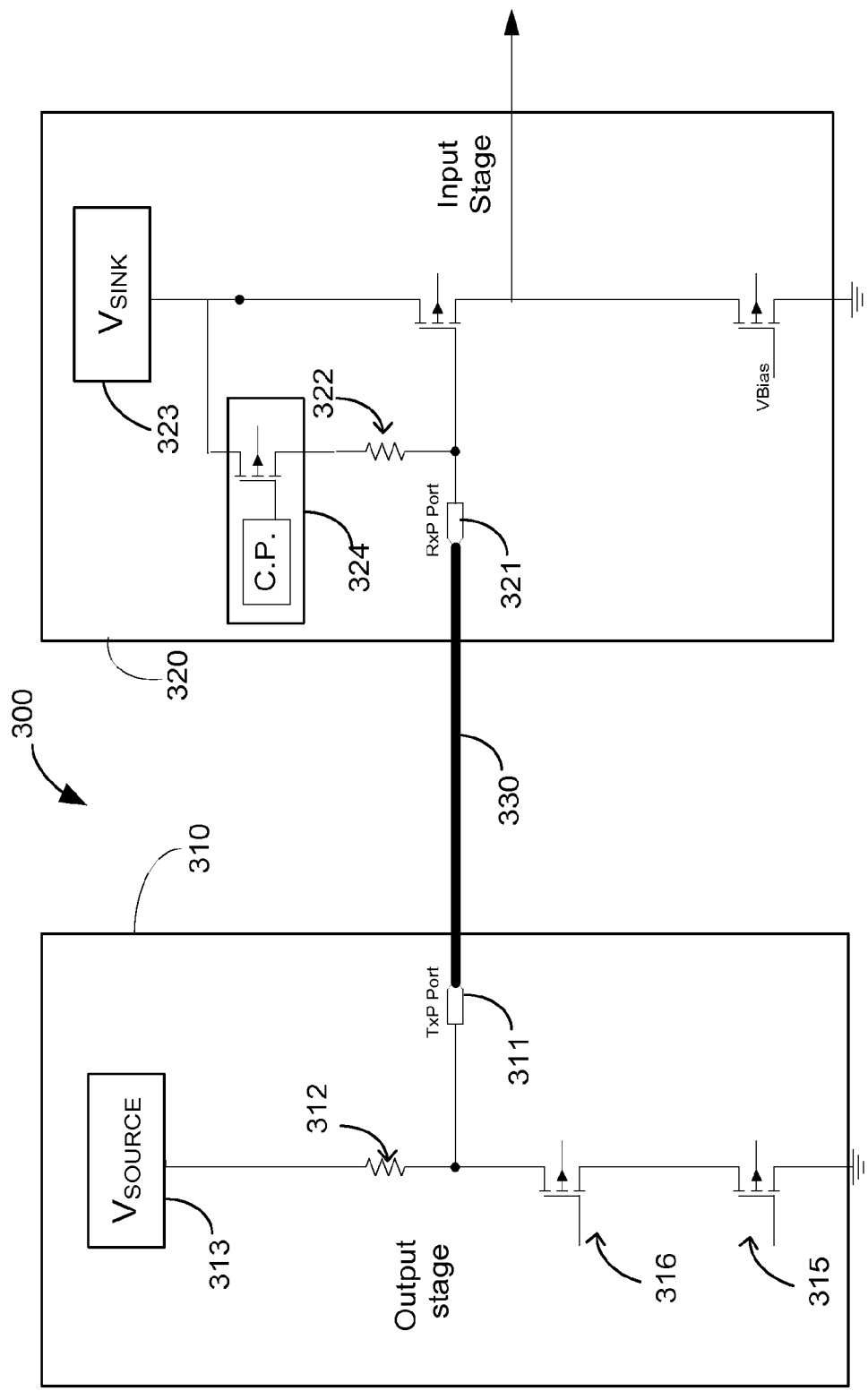
FIG. 3 is an exemplary electric diagram of a digital multimedia interface connectivity illustrating a protection mechanism according to one embodiment of the invention.

FIG. 3 shows an exemplary electric diagram 300 illustrating a protection mechanism according to one embodiment of the invention. A source port 311 is connected to a sink port 321 through a DC-coupled HDMI connection 330. The source port 311 and the sink port 321 may be a TMDS channel, transmitting TMDS characters or a clock channel transporting a video pixel clock of the HDMI. In an embodiment, the data rate of the TDMC characters is 2.25 Gb/Sec or higher.

The source port 311 is connected to an output stage circuit 310 of a source device. The source port 311 may also be a part of the output stage circuit 310 of a source device. The output stage circuit 310, in an embodiment, is a line driver that includes a termination 312, e.g., in a form of a 50 Ohm resistor. The output stage circuit 310 also includes a power source $V_{SOURCE}$ 313, and devices 315 and 316. In an embodiment, the devices 315 and 316 are DC current source devices which set the total DC current level in the interface. For example, devices 315 and 316 set the TMDS swing.

The sink port 321 is connected to an input stage circuit 320 of a sink device. The sink port 321 may also be part of the input stage circuit 320. The input stage circuit 320, in an embodiment, is a high-impedance input stage, that includes a termination 322, e.g., in a form of a 50 Ohm resistor, which is connected to a power source $V_{SINK}$ 323.

According to an embodiment of the invention, a protection component 324 is connected in series to the termination 322 and the power source $V_{SINK}$ 323. When the power source $V_{SINK}$ 323 is off, the protection component 324 is at an off state, hence any DC current flowing from the $V_{SOURCE}$ 313 is blocked by the component 324. When the power source $V_{SINK}$ 323 is on, the protection component 324 is switched to allow DC currents to flow from the $V_{SINK}$ 323 to the output stage circuit 310.

In one embodiment, the protection component 324 is realized as a n-channel metal-oxide-semiconductor (NMOS) device connected to a charge-pump unit (C.P.) at the NMOS device gate. The power source $V_{SINK}$ 323 is connected to a drain contact of the NMOS device while the termination 322 is connected to a source contact of the NMOS device. When the power source $V_{SINK}$ 323 is off (e.g., grounded) no DC current flows through the NMOS device, thus the input stage 320 is protected. When the power source $V_{SINK}$ 323 is on, the charge-pump unit is used, to increase the voltage amplitude at the NMOS device's gate in order to all allow connectivity through the NMOS device.

Figure 4:
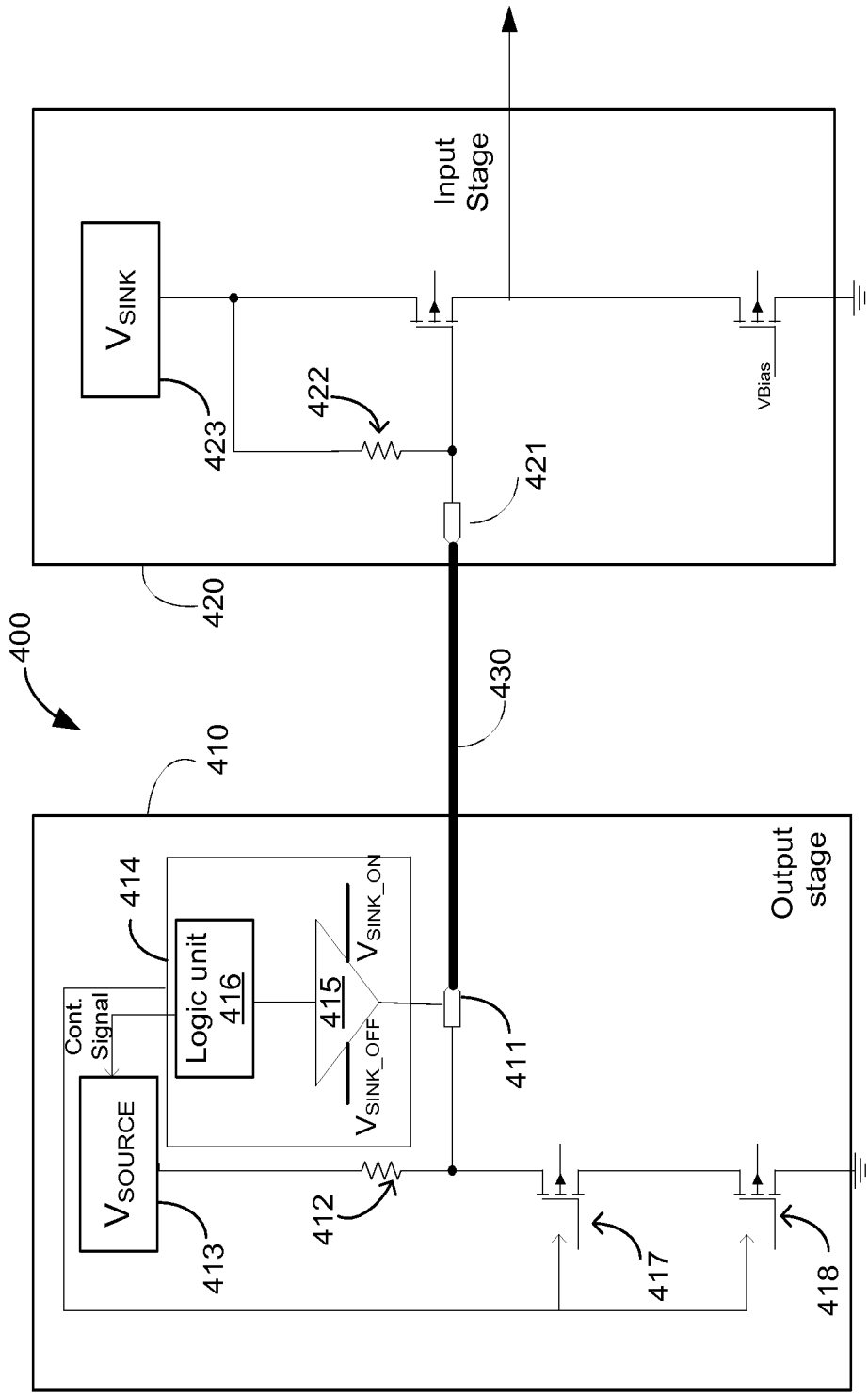
FIG. 4 is an exemplary electric diagram of a digital multimedia interface connectivity illustrating a protection mechanism according to one embodiment of the invention.

FIG. 4 shows an exemplary electric diagram 400 illustrating a protection mechanism according to another embodiment of the invention. A source port 411 is connected to a sink port 421 through a DC-coupled HDMI connection 430. The source port 411 and the sink port 421 may be a TMDS channel transmitting TMDS characters, or a clock channel transmitting a video pixel clock of the HDMI.

The source port 411 is connected to an output stage circuit 410 of a source device. The source port 411 may also be a part of the output stage circuit 410. The output stage circuit 410 includes a termination 412, e.g., in a form of a 50 Ohm resistor. The output stage circuit 410 also includes a power source $V_{SOURCE}$ 413, and devices 417 and 418 which are DC current source devices. The sink port 421 is connected to an input stage circuit 420 of a sink device. The input stage circuit 420 includes a termination 422, e.g., in a form of a 50 Ohm resistor, which is connected to a power source $V_{SINK}$ 423.

According to this embodiment, a protection component 414 is included in the output stage circuit 410 of the source device and connected to the source port 411. The protection component 414 protects both the output stage circuit 410 at the source device and the input stage circuit 420 at the sink device from high levels of DC current. Specifically, when the power source $V_{SINK}$ 423 is off (e.g., the $V_{SINK}$ is grounded or floated), the protection component 414 automatically shuts off both the power source $V_{SOURCE}$ 413 and the DC current devices 417 and 418. In an embodiment, the DC current devices 417 and 418 are turned off by forcing their gate terminals to 0v. That is, in such a case the output stage 410 is at a tri-state. As a result, no DC current flows from the output stage circuit 410 to the input stage circuit 420. When the power source $V_{SINK}$ 423 is on, the protection component 414 switches on the $V_{SOURCE}$ 413, and devices 417 and 418 to power the output stage circuit 410. In an embodiment, the DC current devices 417 and 418 are turned on by connecting their gate terminals to a certain bias voltage which sets their current levels.

In one embodiment, the protection component 414 is realized as a detector 415 and a logic unit 416. The detector 415 compares the voltage amplitude at the source port 411 to two predefined configurable thresholds, $V_{SINK\_ON}$ and $V_{SINK\_OFF}$. The $V_{SINK\_OFF}$ threshold represents the voltage level indicating that the $V_{SINK}$ 423 is off. For example, if $V_{SINK}$ 423 is off and the source port 411 is a TMDS channel port with no termination 412, then the voltage level at the source port 411 would fall from 3.3V to 0V. However, if the source port 411 is a TMDS channel port with the termination 412, then DC current flows from the $V_{SOURCE}$ 413 to devices 417 and 418, hence this amplitude is different than 0V. Thus, the $V_{SINK\_OFF}$ threshold level is a function of the voltage of $V_{SOURCE}$ 413, the termination 412, if such exists, and the current level being sunk by the output stage circuit 410 through devices 417 and 418. The $V_{SINK\_ON}$ represents normal voltage amplitude of signals on the connection 430. In one embodiment, the $V_{SINK\_ON}$ threshold level is a voltage level of a TMDS signal or clock signal, as defined by the HDMI standard.

If the detector 415 determines that the voltage level of a signal at the source port 411 is below the $V_{SINK\_OFF}$ threshold level, the logic unit 416 asserts a control signal for powering off the power source $V_{SOURCE}$ 413 and devices 417 and 418, thereby transitioning the output stage circuit 410 to a tri-state. Thus, no DC current flows between the output stage circuit 410 and the input stage circuit 420.

The detector 415 continuously monitors the voltage level of a signal at the source port 411, and when such a signal has an amplitude equal to or higher than the $V_{SINK\_ON}$, the logic unit 416 asserts a control signal to power on the power source $V_{SOURCE}$ 413, and devices 417 and 418. In an embodiment disclosed herein, the logic unit 416 may be implemented in hardware, software, firmware, or combination thereof. The software and/or firmware are tangibly embodied in a non-transitory machine-readable storage medium that can be in a form of, for example, a digital circuit, an analogy circuit, a magnetic medium, or combination thereof.

Figure 5:
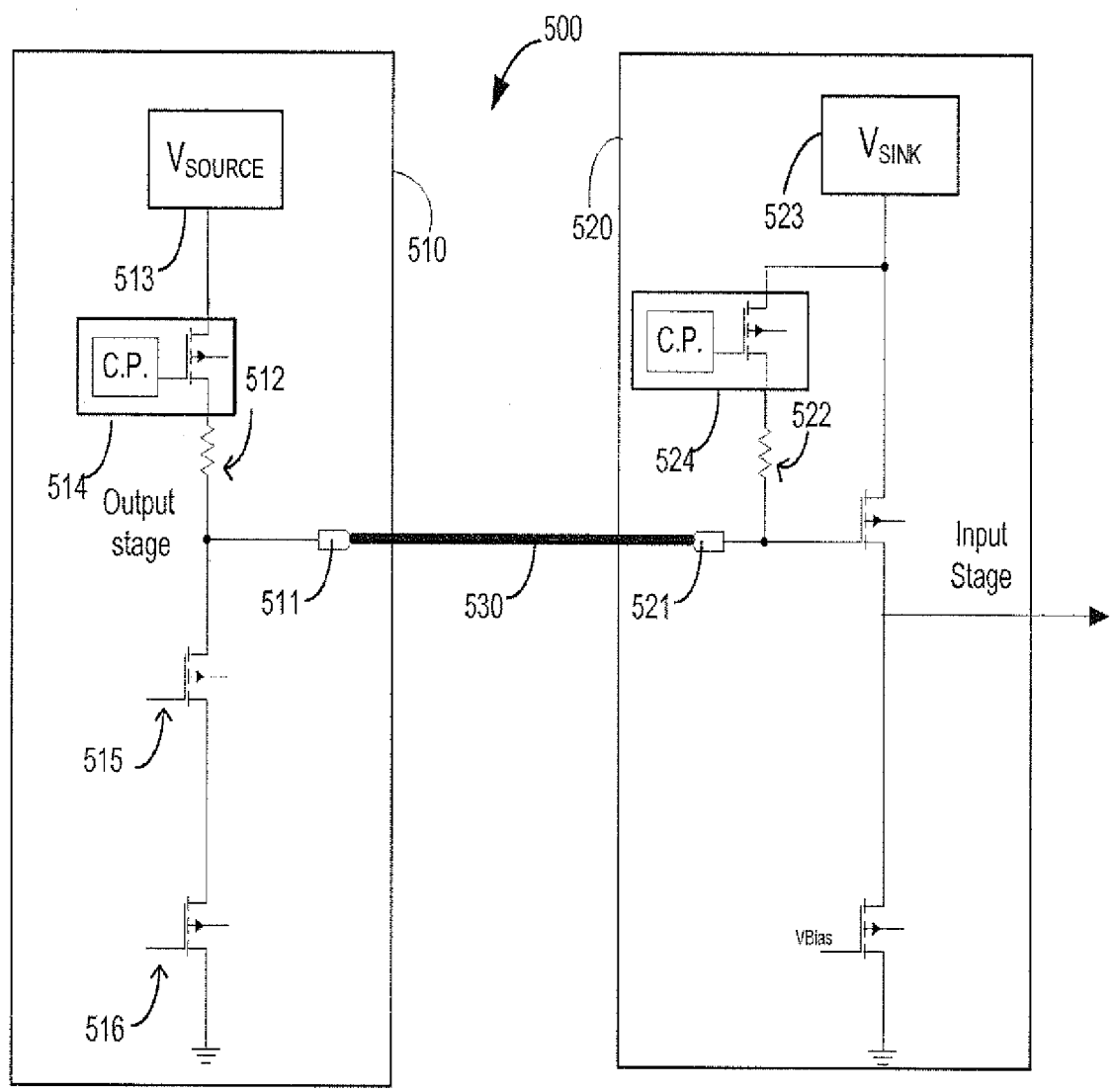
FIG. 5 is an exemplary electric diagram of a digital multimedia interface connectivity illustrating a protection mechanism according to one embodiment of the invention.

FIG. 5 shows an exemplary electric diagram 500 illustrating a protection mechanism according to one embodiment of the invention. A source port 511 is connected to a sink port 521 through a DC-coupled HDMI connection 530. The source port 511 and the sink port 521 may be a TMDS channel, transmitting TMDS characters or a clock channel transporting a video pixel clock of the HDMI. In an embodiment, the data rate of the TDMC characters is 2.25 Gb/Sec or higher.

The output stage circuit 510 includes a source port 511, a termination 512, a power source $V_{SOURCE}$ 513, as well as DC current devices 515 and 516. The input stage circuit 520 includes a sink port 521, a termination 522, and a power source $V_{SINK}$ 523, and a protection component 524. These elements are described above, for example, in reference to FIG. 5.

According to this embodiment, a protection component 514 is connected between the termination 512 and the power source $V_{SOURCE}$ 513 in output stage circuit 510. When the power source $V_{SOURCE}$ 513 is off, the protection component 514 is at an off state, devices 515 and 516 are also at an off state, hence any DC current flowing from the $V_{SINK}$ 523 is blocked by the component 514 and devices 515 and 516. When the power source $V_{SOURCE}$ 513 is on, the protection component 514 is switched on to allow DC currents to flow from the $V_{SOURCE}$ 513 to the termination 512 at the output stage circuit 510, and devices 515 and 516 are active.

In one embodiment, the protection component 514 is realized as a NMOS device connected to a charge-pump unit (C.P.) at the NMOS device gate. The power source $V_{SOURCE}$ 513 is connected to a drain contact of the NMOS device while the termination 512 is connected to a source contact of the NMOS device. When the power source $V_{SOURCE}$ 513 is off (e.g., grounded) no DC current flows through the NMOS device, thus the output stage circuit 510 and the input stage 520 are protected. When the power source $V_{SOURCE}$ 513 is on, the charge-pump unit is used, to increase the voltage amplitude at the NMOS device's gate in order to all allow connectivity through the NMOS device.

It should be noted that the protection components 514 and 524 can be operable in a sink device and a source device connected to each other. That is, the HDMI connectivity is protected when both protection components 514 and 524 are utilized. It should be further noted, in other embodiments, any one of the protection components 324, 414, and 514 can be utilized in a HDMI system to protect both the source and sink devices of such system.

The various embodiments have been described with reference to a specific implementation in a HDMI system, where TMDS and clock channels should be protected. However, other embodiments would be apparent to one of ordinary skill in the art. For example, the embodiments described herein can be easily adapted to protect digital display interface standards that use DC coupled connectivity. Examples for such digital interfaces include low-voltage differential signaling (LVDS) connectivity, and the like.

While the present invention has been described at some length and with some particularity with respect to the several described embodiments, it is not intended that it should be limited to any such particulars or embodiments or any particular embodiment, but that it is to be construed with reference to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What is claimed is:

1. A source circuit for protecting connectivity of a digital multimedia interface, the source circuit is connected in a source multimedia device, comprising:
   a source port comprising a source voltage and configured for connection to a sink multimedia device;
   a termination resistor coupled to the source port;
   a protection component coupled to the termination resistor and a power source of the source multimedia device, the protection component blocks any direct current path from the power source of the source multimedia device through the source port and any direct current path from the power source of the source multimedia device to a ground of the source multimedia device, wherein the direct current paths are blocked upon a first indication signal that the power source of the sink multimedia device is off and the power source of the source multimedia device is on;
   at least one current device coupled between the source port and the ground to set a total current level;
   a detector coupled to the source port for detecting if the power source of the sink multimedia device is off; the detector is further configured to detect if the power source of the sink multimedia device is on;
   a logic unit for asserting a first indication signal when it is detected that the power source of the sink multimedia device is off, wherein the first indication signal shuts off the power source of the source multimedia device and the at least one current device, the logic unit is further configured to assert a second indication signal when it is detected that the power source of the sink multimedia device is on, wherein the second indication signal turns on the power source of the source multimedia device and the at least one current device; and
   wherein the detector is further configured to monitor an amplitude level of a signal at the source port and to compare the amplitude level to a first threshold and a second threshold, wherein the first threshold defines if the power source of the sink multimedia device is off and the second threshold defines if the power source of the sink multimedia device is on, and
   wherein the first threshold is a function of the source voltage.

2. The source circuit of claim 1, wherein the first threshold defines if the power source of the sink multimedia device is off and the second threshold defines if the power source of the sink multimedia device is on, wherein the first threshold and the second threshold are programmable.

3. The source circuit of claim 1, wherein the digital multimedia interface is a high-definition multimedia interface (HDMI).

4. The source circuit of claim 3, wherein the source port is of any one of: a clock channel and a transition-minimized differential signaling (TMDS) channel of the HDMI, wherein signals are transmitted over any one of the clock channel and the TMDS channel at a rate that is at least 2.25 Giga bit per second.

5. A circuit for protecting connectivity of a digital multimedia interface, comprising:
   a sink port of a sink multimedia device, the sink port configured for connection to a source multimedia device;
   a sink termination resistor coupled to the sink port; and
   a sink protection component coupled in series between the termination resistor and a power source of the sink multimedia device, the protection component blocks any source direct current path through the sink port when the power source of the sink multimedia device is off and the power source of the source multimedia device is on;
   a source port configured for connection to the sink multimedia device;
   at least one current device coupled between the source port and a ground of the source multimedia device, wherein the current device is to set a total current level;
   a source termination resistor coupled to the source port;
   a source protection component coupled between the source termination resistor and the power source of the source multimedia device, the source protection component blocks any sink direct current path through the source port when the power source of the source multimedia device is off and the power source of the sink multimedia device is on;
   at least one current device coupled between the source port and the ground to set a total current level;
   a detector coupled to the source port for detecting if the power source of the sink multimedia device is off; the detector is further configured to detect if the power source of the sink multimedia device is on;
   a logic unit for asserting a first indication signal when it is detected that the power source of the sink multimedia device is off, wherein the first indication signal shuts off the power source of the source multimedia device and the at least one current device, the logic unit is further configured to assert a second indication signal when it is detected that the power source of the sink multimedia device is on, wherein the second indication signal turns on the power source of the source multimedia device and the at least one current device; and
   wherein the detector is further configured to monitor an amplitude level of a signal at the source port and to compare the amplitude level to a first threshold and a second threshold, wherein the first threshold defines if the power source of the sink multimedia device is off and the second threshold defines if the power source of the sink multimedia device is on, and wherein the first threshold is a function of the source voltage.

6. The circuit of claim 5, wherein the each of the source protection component and the sink protection component includes a NMOS device connected to a charge pump.

7. The circuit of claim 6, wherein the NMOS device in the sink protection component disconnects the sink termination resistor from the power source of the sink multimedia device when the sink multimedia device is off, and wherein the NMOS device in the source protection component disconnects the source termination resistor from the power source of the source multimedia device when the sink multimedia device is off.

8. The circuit of claim 6, wherein a charge pump enables a NMOS device in the sink protection component to connect the sink termination resistor to the power source of the sink multimedia device when the sink multimedia device is on; and wherein a charge pump enables a NMOS device in the source protection component to connect the source termination resistor to the power source of the source multimedia device when the sink multimedia device is on.

9. The circuit of claim 5, wherein the digital multimedia interface is a high-definition multimedia interface (HDMI).

10. The circuit of claim 9, wherein each of the sink port and source port is any one of:
- a clock channel and a transition-minimized differential signaling (TMDS) channel of the HDMI, wherein signals are transmitted over any one of the clock channel and the TMDS channel at a rate that is at least 2.25 Giga bit per second.

* * * * *